United States Patent
Gualtieri et al.

(10) Patent No.: US 11,820,611 B2
(45) Date of Patent: Nov. 21, 2023

(54) LOAD PLANNING OPTIMIZATION USING AUTOMATED 3D PACKING

(71) Applicant: Verizon Connect Development Limited, Dublin (IE)

(72) Inventors: Marco Gualtieri, Florence (IT); Leonardo Taccari, Florence (IT); Andrea Benericetti, Prato (IT); Tommaso Bianconcini, Campi Bisenzio (IT); Alessio Frusciante, Florence (IT); David Di Lorenzo, Florence (IT)

(73) Assignee: Verizon Connect Development Limited, Dublin (IE)

( * ) Notice: Subject to any disclaimer, the term of this patent is extended or adjusted under 35 U.S.C. 154(b) by 175 days.

(21) Appl. No.: 17/446,208

(22) Filed: Aug. 27, 2021

(65) Prior Publication Data
US 2021/0395026 A1 Dec. 23, 2021

Related U.S. Application Data

(63) Continuation of application No. 16/296,676, filed on Mar. 8, 2019, now Pat. No. 11,111,090.

(51) Int. Cl.
*G06F 7/00* (2006.01)
*B65G 15/30* (2006.01)
(Continued)

(52) U.S. Cl.
CPC .............. *B65G 15/30* (2013.01); *G06T 19/006* (2013.01); *G09B 9/00* (2013.01); *B65G 2814/0304* (2013.01)

(58) Field of Classification Search
CPC ............ B65G 65/30; B65G 2814/0304; G06T 19/006; G09B 9/00; G06Q 10/08; G06Q 50/28; G06Q 10/04
(Continued)

(56) References Cited

U.S. PATENT DOCUMENTS 8,924,007 B2 * 12/2014 Arunapuram .......... G06Q 10/04
700/229
11,514,386 B1 * 11/2022 Soles ................... G06Q 10/087
(Continued)

OTHER PUBLICATIONS

Aggoun, et al., "Panorama of real-life applications in logistics embedding bin packing optimization algorithms, robotics and cloud computing technologies", GOL'16—3rd IEEE International Conference on Logistics Operations Management, May 2016, Morocco, Morocco. 2016, <10.1109/GOL.2016.7731693>. <hal-01378469>. Nov. 30, 2016, 5 pages.
(Continued)

*Primary Examiner* — Yolanda R Cumbess

(57) ABSTRACT

A load planning platform may generate, according to one or more loading rules, a preliminary packing solution that simulates placing unpacked items, in a set of items, into a container. The load planning platform may generate a set of packing solutions by applying one or more available moves to the preliminary packing solution. The load planning platform may select a final packing solution from the set of packing solutions based on one or more optimization criteria associated with the container and the set of items. The load planning platform may provide access to a three-dimensional rendering of the final packing solution that differentiates each item in the set of items based on a sequence in which the set of items are to be unloaded from the container.

20 Claims, 7 Drawing Sheets

(51) Int. Cl.
*G09B 9/00* (2006.01)
*G06T 19/00* (2011.01)

(58) Field of Classification Search
USPC .............. 700/213–215, 217, 220, 228–229
See application file for complete search history.

(56) References Cited

U.S. PATENT DOCUMENTS

| | | | |
|---|---|---|---|
| 2005/0055181 A1* | 3/2005 | Verdura | G06F 30/00 |
| | | | 703/1 |
| 2018/0200761 A1 | 7/2018 | Putcha et al. | |
| 2019/0206059 A1* | 7/2019 | Landman | G06T 7/66 |

OTHER PUBLICATIONS

Ma, et al., "Packing Irregular Objects in 3D Space via Hybrid Optimization", Eurographics Symposium on Geometry Processing 2018, vol. 37 (2018), No. 5, 11 pages. Aug. 2018.

Stolk, et al., "Combining Vehicle Routing and Packing for Optimal Delivery Schedules of Water Tanks", https://doi.org/10.1057/ori.2013.1, Jan. 31, 2013, 21 pages.

* cited by examiner

LOAD PLANNING OPTIMIZATION USING AUTOMATED 3D PACKING

RELATED APPLICATION

This application is a continuation of U.S. patent application Ser. No. 16/296,676, entitled "LOAD PLANNING OPTIMIZATION USING AUTOMATED 3D PACKING," filed Mar. 8, 2019 (now U.S. Pat. No. 11,111,090), which is incorporated herein by reference in its entirety.

BACKGROUND

Packing problems refer to a class of optimization problems that involve attempting to pack items together into one or more containers. For example, in computer science, an optimization problem generally involves finding a "best" solution among various feasible solutions. Accordingly, in a packing problem (e.g., a bin packing problem, a knapsack problem, a Conway puzzle, and/or the like), the goal is typically to pack items into a given container as densely as possible or to pack all items using as few containers as possible. Packing problems often relate to real-life packaging, storage, and transportation issues (e.g., loading parcels, packages, and/or other items into a delivery truck, a shipping container, and/or the like).

DETAILED DESCRIPTION OF PREFERRED EMBODIMENTS

Figure 1A:
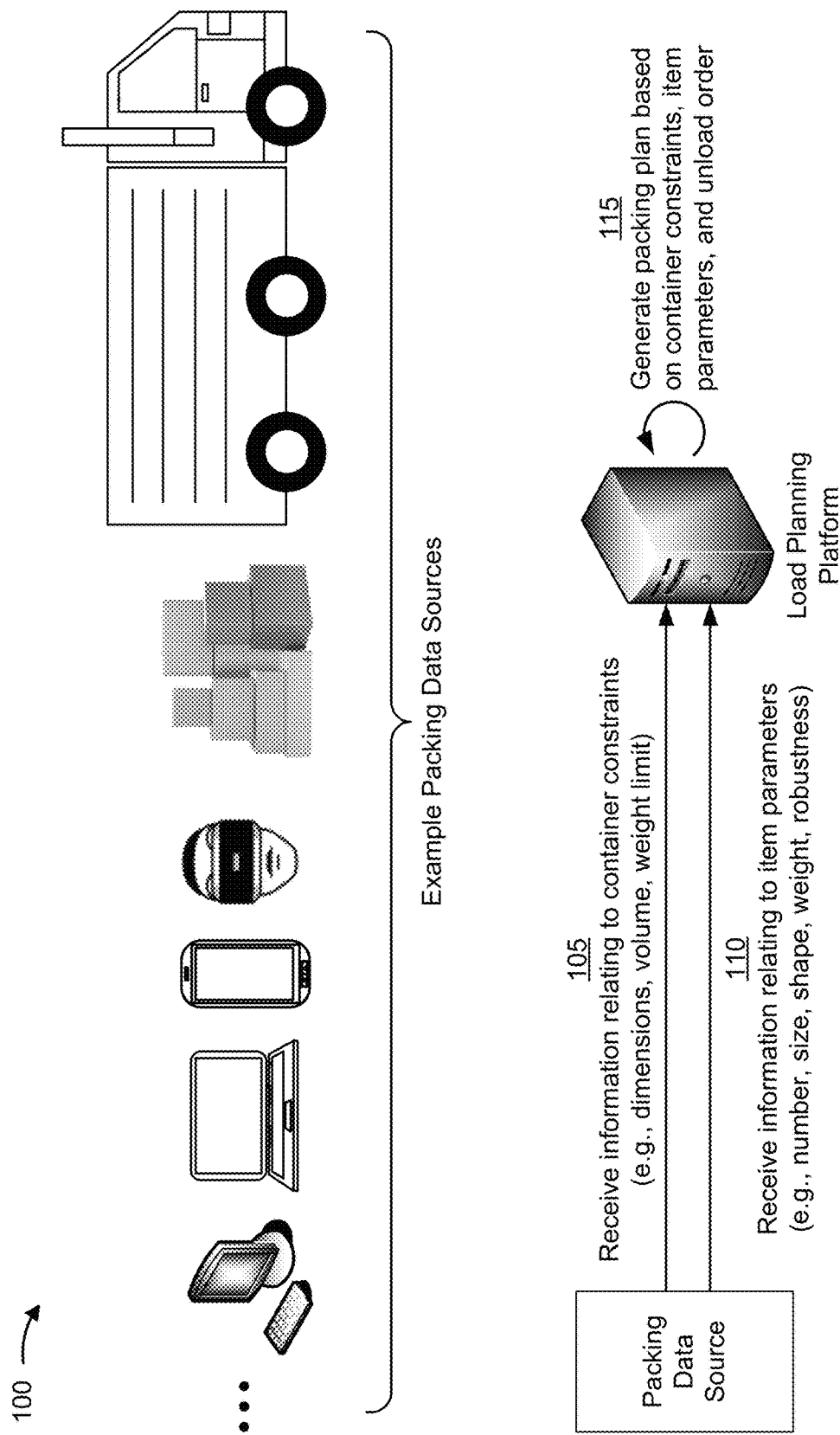
FIGS. 1A-1D are diagram of one or more example implementations described herein.

The following detailed description of example implementations refers to the accompanying drawings. The same reference numbers in different drawings can identify the same or similar elements.

Various industries (e.g., transportation, deliveries, field services, moving services, and/or the like) are often faced with problems that relate to matching parcels, packages, goods, freight, and/or other items to trucks or containers. For example, a given container can have a limited capacity with respect to the items that can be placed therein based on dimensions, weight limits, and/or the like. Furthermore, in addition to implicating packing problems that aim to pack items into a given container as densely as possible or to pack all items using as few containers as possible, matching items to containers can implicate other optimization problems, such as a vehicle routing problem. In particular, the vehicle routing problem has a goal to find an optimal route or set of routes for a vehicle or set of vehicles to traverse in order to deliver various items to a set of customers. For example, a solution to a typical vehicle routing problem identifies a set of vehicle trips from a given location (e.g., a depot) to a set of customers such that each trip starts from and ends at the given location, each customer is visited exactly once, and a total demand handled by each vehicle does not exceed applicable limitations on vehicle capacity.

While there are various algorithms and/or other approaches designed to solve packing and/or vehicle routing problems, existing approaches do not adequately handle real-world constraints that relate to planning how to load a set of items into a container. For example, after a particular set of items has been matched to a particular container, further planning is needed to determine an optimal strategy to load the particular set of items into the corresponding container. Among other factors, this planning can depend on a sequence in which the items are to be unloaded from the container, whether and/or how items can be rotated and/or stacked, and/or the like. In general, these problems are typically addressed using a combination of domain knowledge and human intuition, but this approach is time-consuming and error-prone.

Accordingly, suboptimal load planning can lead to wasted resources, safety hazards, damage to items that are improperly loaded, and/or the like. For example, wasted resources can include computing resources (e.g., processing resources, memory resources, communication resources, and/or the like) associated with devices used to plan deliveries, devices used to track locations of items and/or delivery vehicles, and/or the like. Furthermore, suboptimal load planning can lead to wasted vehicle resources, including additional fuel, increased wear-and-tear, and/or the like (e.g., when more vehicle trips than necessary are used to deliver a given set of items). Further still, due to inertia, the force of gravity, unbalanced loading, and/or the like, items can shift within the container during transport, which can lead to vehicle rollover, stacked items toppling over, part of the vehicle dragging on the road, uneven tire wear, and/or the like even if the items were tightly packed within the container when originally loaded.

Some implementations described herein include a load planning platform configured to use one or more combinatorial optimization algorithms to automate decisions on how to pack a set of items into a three-dimensional container or a set of three-dimensional containers based on real-world constraints (e.g., an order in which the items are to be loaded into and unloaded from the three-dimensional container(s), constraints associated with the three-dimensional container(s) such as available space and weight limits, sizes and weights of the items to be loaded into the three-dimensional container(s), whether certain items are fragile or robust, how to load the items in a way that can minimize a risk of the items shifting or falling over during transport, and/or the like). Furthermore, the load planning platform can provide access to a three-dimensional rendering of a final packing solution together with a plan or instructions for guiding a user through loading the items into the three-dimensional container(s) and subsequently unloading the items from the three-dimensional container(s).

In this way, by automating various decisions on how to pack items into a three-dimensional container or set of three-dimensional containers, the load planning platform can generate a packing strategy that makes efficient use of available space in the three-dimensional container(s), which can save space within the container(s) and thereby conserve various resources. For example, this can conserve vehicle resources by using less fuel, reducing a need to repair and/or replace worn out components, and/or the like because more items can be loaded into a given container and thus fewer vehicle trips can be needed to deliver a given set of items. Furthermore, this can conserve various computing resources (e.g., processing resources, communication resources, and/ or the like) because fewer vehicle trips means that fewer computing resources are needed to plan the vehicle routes, track vehicle locations, communicate with vehicle operators, and/or the like. Further still, using the load planning platform to determine the most efficient packing strategy can save time that would otherwise be wasted assessing how to load items into the container(s) either through pre-planning or trial-and-error, potentially having to load and unload one or more items multiple times if an unload sequence was not considered, and/or the like. Moreover, by considering constraints such as fragility, robustness, and/or the like when deciding where to place items in the container(s), the load planning platform can reduce a risk of damage to the items transported within the container(s), reduce safety risks due to items moving within the container(s), and/or the like.

Figure 1B:
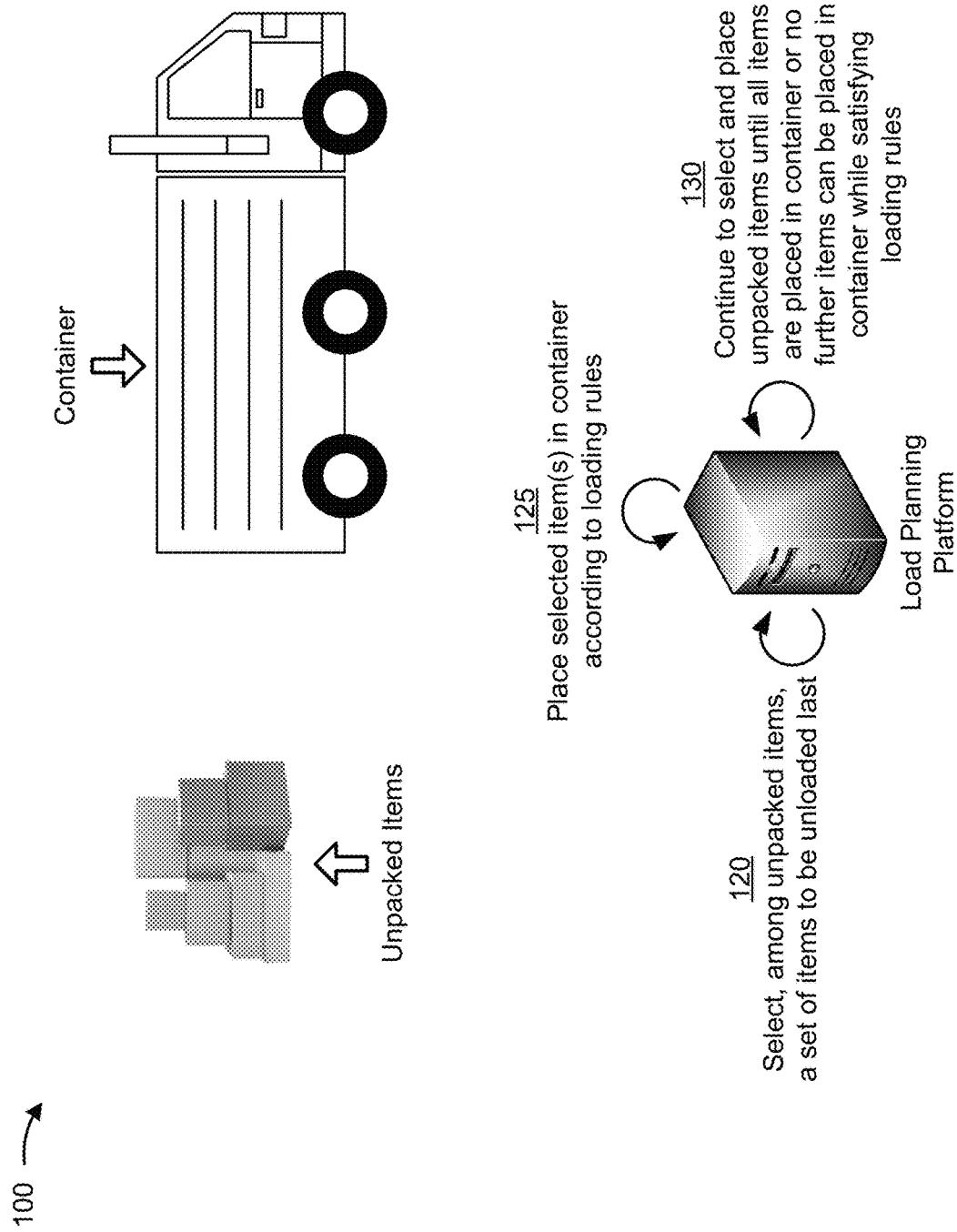
Figure 1C:
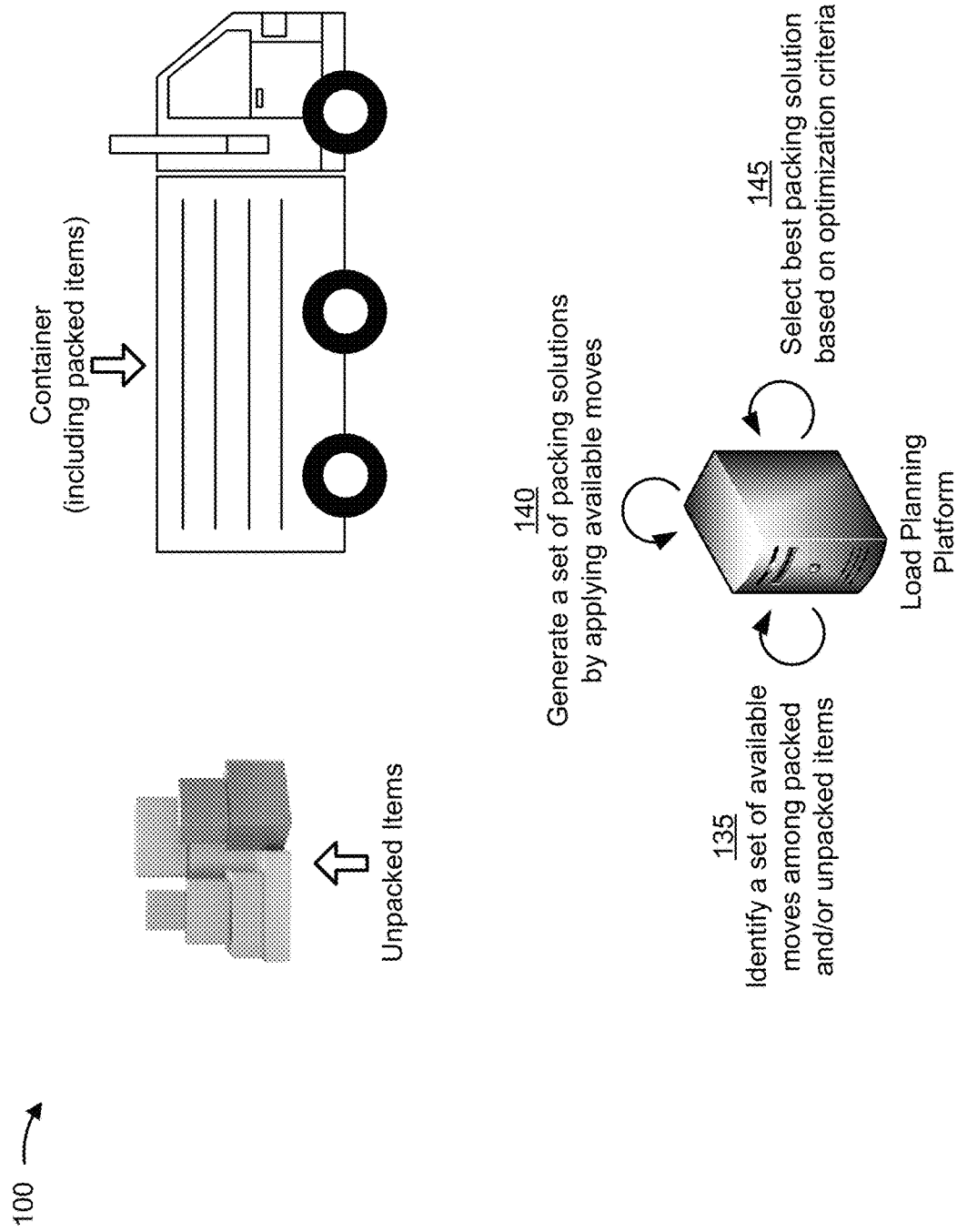
Figure 1D:
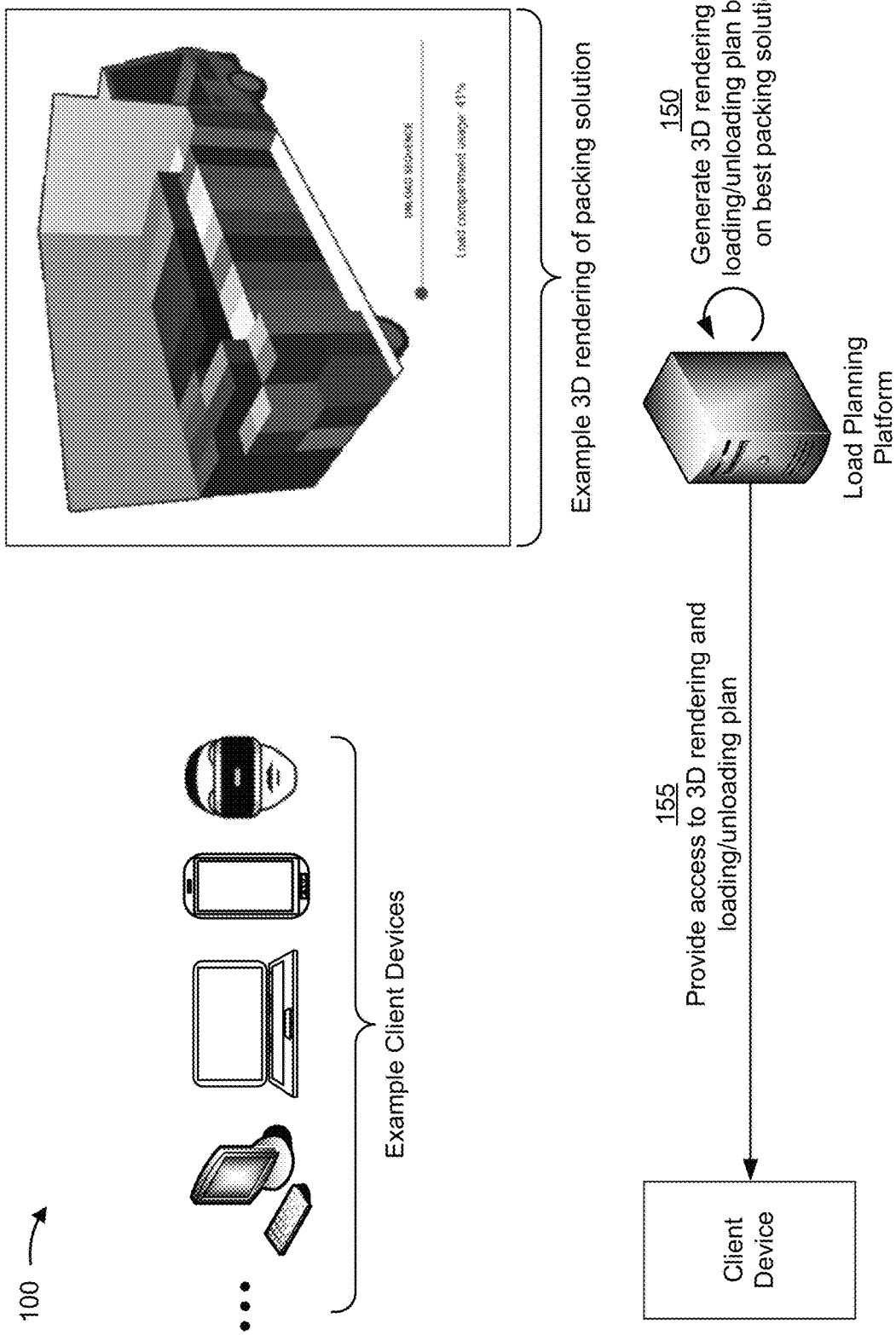

FIGS. 1A-1D are diagrams of one or more example implementations 100 described herein. As will be described in further detail herein, example implementation(s) 100 can include a load planning platform, one or more packing data sources, one or more client devices, a three-dimensional container, and a set of items to be loaded into the three-dimensional container. As shown in FIG. 1A, the load planning platform can determine various parameters and/or constraints associated with the three-dimensional container and the set of items to be loaded into the three-dimensional container based on information received from the one or more packing data sources. As shown in FIG. 1B, the load planning platform can use the various parameters and/or constraints to generate a preliminary packing solution according to a heuristic technique by attempting to place unpacked items into the three-dimensional container until all items are placed in the three-dimensional container or no further items can be placed in the three-dimensional container without violating one or more loading rules. As shown in FIG. 1C, the load planning platform can attempt to optimize (e.g., improve upon) the preliminary packing solution by applying one or more moves that allow for unpacked items to be placed into the three-dimensional container, packed items to be rotated, swapped, relocated, and/or the like. As shown in FIG. 1D, the load planning platform can generate information to put the optimized packing solution into action by providing the client device(s) with access to a three-dimensional rendering of the optimized packing solution, instructions for guiding a user through implementing the optimized packing solution, and/or the like.

As shown in FIG. 1A, and by reference number 105, the load planning platform can receive, from the one or more packing data sources, information relating to various constraints associated with the three-dimensional container. For example, the constraints associated with the three-dimensional container can include dimensions of the three-dimensional container (e.g., a length, width, and height), a volume of the three-dimensional container, a weight limit of the three-dimensional container, and/or the like. Furthermore, in some implementations, the constraints associated with the three-dimensional container can include details related to any irregularities in a shape of the three-dimensional container (e.g., whether the container has a Luton body enclosure style in which part of the enclosure extends over a cab of the vehicle).

The packing data sources that provide the information related to the constraints associated with the three-dimensional container can include any suitable device or combination of devices that can capture or provide such information. For example, in some implementations, a user can input dimensions, weight limits, and/or the like for the three-dimensional container into a desktop computer, a laptop computer, a smartphone, and/or a similar device, which can convey the constraints associated with the three-dimensional container to the load planning platform. Additionally, or alternatively, an augmented reality device, a mixed reality device, a hand-held laser scanner, a structured light scanner, and/or another suitable device having appropriate three-dimensional scanning capabilities can be used to collect data relating to a shape of the three-dimensional container. Additionally, or alternatively, the three-dimensional container can be part of or otherwise associated with a connected vehicle having communication capabilities, whereby the connected vehicle can convey the information related to the constraints associated with the three-dimensional container to the load planning platform.

As further shown in FIG. 1A, and by reference number 110, the load planning platform can receive, from the one or more packing data sources, information relating to various parameters associated with the set of items to be loaded into the three-dimensional container. For example, the parameters associated with the set of items to be loaded into the three-dimensional container can include a quantity of items to be loaded into the three-dimensional container, a size (e.g., a length, width, and height) and/or shape of the items to be loaded into the three-dimensional container, a weight of the items to be loaded into the three-dimensional container, and/or the like. Furthermore, in some implementations, one or more of the items can be associated with a robustness parameter, which can indicate whether a given item is durable or fragile, sturdy or flimsy, able or unable to support weight, and/or the like. In some implementations, the set of items to be loaded into the three-dimensional container can be organized into one or more groups (e.g., items that have the same or similar sizes or shapes, items that are to be unloaded at a single stop, and/or the like).

In some implementations, the packing data sources that provide the information related to the parameters associated with the set of items to be loaded into the three-dimensional container can include any suitable device or combination of devices that can capture or provide such information. For example, the packing data sources can include a desktop computer, a laptop computer, a smartphone, and/or a similar device that can obtain information related to dimensions, shapes, weights, and/or the like for the set of items via user input, from a storage device, and/or the like and convey the parameters related to the set of items to the load planning platform. Additionally, or alternatively, an augmented reality device, a mixed reality device, a hand-held laser scanner, a structured light scanner, and/or another suitable device having appropriate three-dimensional scanning capabilities can be used to collect data relating to the size and shape of the items to be loaded into the three-dimensional container. Additionally, or alternatively, one or more of the items can be provided with a printed label, a barcode, a marking, a radio frequency identification (RFID) tag, and/or the like, which can be used to obtain the information related to the size, shape, and weight of the corresponding item(s).

As further shown in FIG. 1A, and by reference number 115, the load planning platform can generate a packing plan based on the information relating to the constraints associated with the three-dimensional container, the parameters related to the items to be loaded into the three-dimensional container, and a sequence in which the set of items are to be unloaded from the three-dimensional container (e.g., based on a delivery route or delivery sequence, which can be input by a user, obtained from a route planning device, and/or the like). For example, as will be described in further detail below, the load planning platform can use a heuristic technique to generate a preliminary packing solution that simulates placing unpacked items, in the set of items, into the three-dimensional container according to one or more loading rules until a condition is satisfied. The load planning platform can then apply, to the preliminary packing solution, one or more available moves that change a simulated placement for one or more items within the three-dimensional container. Accordingly, the load planning platform can select a final (e.g., most efficient or most optimal) packing solution from the set of packing solutions based on one or more optimization criteria, and the packing plan can correspond to the final packing solution that is selected based on the one or more optimization criteria.

As shown in FIG. 1B, and by reference number 120, the load planning platform can select, among the set of items to be loaded into the three-dimensional container, one or more unpacked items to be unloaded last. More particularly, as mentioned above, the load planning platform can generate a packing plan according to a sequence in which items are to be unloaded from the three-dimensional container (e.g., based on a delivery schedule, a delivery route, and/or the like), where items to be unloaded last are loaded into the three-dimensional container first and where items to be unloaded first are loaded into the three-dimensional container last. In other words, items can be loaded into the three-dimensional container in a sequence that is reversed with respect to the sequence in which the items are to be unloaded from the three-dimensional container (i.e., the heuristic technique can start with a set of one or more items to be unloaded from the three-dimensional container last and end with a set of one or more items to be unloaded first).

As further shown in FIG. 1B, and by reference number 125, the load planning platform can use the heuristic technique to place the selected item(s) in the three-dimensional container according to one or more loading rules. In particular, when using the heuristic technique to generate the preliminary packing solution, the load planning platform can start by considering the three-dimensional container to be empty. The one or more loading rules can specify that each item is to be placed at a bottom-most available position within the three-dimensional container, and the loading rules can allow items to be rotated horizontally (e.g., rotated about a vertical axis). In some implementations, the one or more loading rules can further allow certain items to be rotated vertically (e.g., rotated about one or more horizontal axes) and/or disallow certain items to be rotated vertically based on a robustness parameter. For example, an item can be designated "fragile" such that the item cannot be rotated vertically if the robustness parameter satisfies a first threshold value, or alternatively designated "robust" such that the item can be rotated vertically if the robustness parameter satisfies a second threshold value, which can be the same as or different from the first threshold value.

In some implementations, the one or more loading rules can further define whether a particular item can have one or more items stacked above the particular item. For example, one or more items can be placed on top of the particular item if the robustness parameter satisfies a threshold value. Additionally, or alternatively, one or more items can be associated with a parameter (e.g., the robustness parameter or a different parameter) that indicates a weight that the one or more items can support (e.g., a quantity of kilograms or pounds, which can range from zero to a maximum value that is based on a weight limit of the three-dimensional container and/or the like). Accordingly, in some implementations, the one or more loading rules can allow a given item to be placed on top of one or more other items, provided that all items below the given item are designated robust or can otherwise support the aggregate weight of the items located higher in the stack. Furthermore, an additional constraint on placing an item on top of one or more other items can be that top faces of the underneath items form a horizontal plane of sufficient dimensions to fit the item to be placed on top.

The one or more loading rules can additionally, or alternatively, specify that each item is to be placed in a manner that preserves a path to the item relative to a point of ingress and/or egress from the three-dimensional container (e.g., from a door of the three-dimensional container to the item). For example, in some implementations, the one or more loading rules can specify that the path to the item is sufficiently large to allow a person to reach the item at a time that the item is to be unloaded from the vehicle. Accordingly, in some implementations, the one or more loading rules can further take into account one or more variables that relate to the person who will be unloading items from the vehicle (e.g., a wider path might be needed for a bigger delivery-person and a narrower path might be needed for a smaller delivery-person). In some implementations, the load planning platform can allow a violation of the loading rule to preserve a path to each item for one or more items to be unloaded earlier and thus loaded later (e.g., a path might be needed to an item that is to be unloaded before one or more items that are located between the item and the point of ingress and egress).

In some implementations, the one or more loading rules can be further defined to avoid drivability problems. For example, the one or more loading rules can include a constraint to ensure that an overall load is relatively balanced along the three-dimensional container (e.g., from front to back) to avoid the back of the container dragging along a road or other transport surface. Additionally, or alternatively, the one or more loading rules can include a constraint to ensure that the overall load is relatively balanced across the three-dimensional container (e.g., from side to side) to avoid a risk of vehicle rollover, stacked items toppling over, and/or the like. In some implementations, the loading rules defined to avoid drivability problems can further specify that longer items should be placed along or closer to walls of the three-dimensional container, straps are to be wrapped around large or heavy items to prevent such items from moving or shifting during transport, an aggregate weight of items placed in the three-dimensional container does not exceed a weight limit for the three-dimensional container, and/or the like.

Accordingly, as mentioned above, the load planning platform can initially consider the three-dimensional container empty when using the heuristic technique to generate the preliminary packing solution, and a set of items to be unloaded last can be placed in the three-dimensional container in a manner that complies with the applicable loading rules. As further shown in FIG. 1B, and by reference number 130, the load planning platform can continue to select and simulate placing unpacked items into the three-dimensional container using the heuristic technique until a condition is satisfied. For example, in some implementations, the condition can be satisfied when each item in the set of items has a simulated placement in the three-dimensional container. Additionally, or alternatively, the condition can be satisfied when no further items can be placed into the three-dimensional container while satisfying the applicable loading rules. Accordingly, in some implementations, one or more items could remain outside the three-dimensional container when the load planning platform has finished performing the heuristic technique (e.g., because the condition is satisfied).

In this way, the heuristic technique can be used to generate a preliminary packing solution in a manner that satisfies various constraints, including constraints associated with the three-dimensional container (e.g., with respect to capacity, balance, and/or the like), constraints associated with the items to be loaded into the three-dimensional container (e.g., with respect to a sequence in which the items are to be unloaded from the three-dimensional container, whether a given item is fragile or robust, and/or the like), and constraints with respect to effectively using space within the three-dimensional container (e.g., using as much space as possible while also minimizing risks of damage or injury to the items, a vehicle used to transport the items, people present in the vehicle, and/or the like). Furthermore, the preliminary packing solution generated using the heuristic technique can be improved upon during a subsequent optimization phase (to be described in further detail below), which allows the heuristic technique to arrive at the preliminary packing solution in a fast and efficient manner at the possible expense of finding an exact or perfect solution. In this way, various computing resources can be conserved (e.g., processing resources, memory resources, and/or the like) because the heuristic technique trades optimality, completeness, and/or the like for the speed. This can also allow the load planning platform to satisfy real-world practical constraints, as the preliminary packing solution can be computed in a reasonable time frame that is more viable when planning real-world delivery schedules that need to be routinely solved (e.g., on a daily basis, multiple times per day, and/or the like).

As shown in FIG. 1C, and by reference number 135, the load planning platform can attempt to optimize (e.g., improve upon) the preliminary packing solution by identifying a set of available moves among the packed items that have a simulated placement in the three-dimensional container and/or unpacked items that were left out by the heuristic technique. For example, in some implementations, the set of available moves can include one or more of rotating an item horizontally, rotating an item vertically provided that the item is deemed robust or not fragile, swapping a placement for a given pair of items, moving one or more items to a free, unoccupied, or otherwise available space (e.g., a space where no other item is present, an available space on top of one or more other items, and/or the like), inserting one or more items that were left out by the heuristic technique (if any) into the three-dimensional container if there is sufficient space to do so, and/or the like. Accordingly, to optimize (e.g., improve upon) the preliminary packing solution, the load planning platform can identify one or more available moves that can be applied to the preliminary packing solution.

As further shown in FIG. 1C, and by reference number 140, the load planning platform can generate a set of packing solutions by applying the available moves to change the simulated placement for one or more items within the three-dimensional container. In some implementations, the load planning platform can apply the available moves sequentially one after another or apply the available moves in parallel to one another. In some implementations, when multiple possible moves are available based on a current state of the packing solution, the load planning platform can select one particular move that minimizes an average height of items within the three-dimensional container, which can avoid unnecessarily stacking items on top of one another if there is enough space to place an item on the floor of the three-dimensional container or on top of a smaller stack. Furthermore, in the event that multiple moves are equivalent in this respect (e.g., two or more moves equally minimize the average height of items within the three-dimensional container), the load planning platform can break the tie randomly. Additionally, or alternatively, the load planning platform can generate different packing solutions that apply different ones of the possible moves to explore different possible options.

In general, when applying the available moves to generate the set of packing solutions, the available moves can exclude any moves that would revert the packing solution to a previously computed solution (e.g., the preliminary packing solution generated using the heuristic technique, a previous solution computed by applying an available move to the preliminary packing solution or an intermediate packing solution, and/or the like). Furthermore, the available moves can exclude any moves that would violate the one or more loading rules that were applied by the heuristic technique.

The load planning platform can continue to identify and apply available moves in an effort to improve upon the current state of the packing solution until a condition is satisfied. For example, in some implementations, the condition can be satisfied when a quantity of moves that have been applied satisfies a threshold value. Additionally, or alternatively, the condition can be satisfied when an amount of time that the optimization phase has been running satisfies a threshold value. Additionally, or alternatively, the condition can be satisfied when applying further moves does not result in any measurable improvement to the current state of the packing solution (e.g., no improvement with respect to average height of items within the three-dimensional container, a quantity of items within the three-dimensional container, a balance of weight along and/or across the three-dimensional container, and/or the like). In this way, various computing resources can be conserved (e.g., processing resources, memory resources, and/or the like) without substantially compromising precision or efficiency because the optimization phase can have diminishing returns with respect to improving the packing solution. Furthermore, in this way, the load planning platform can help to satisfy practical constraints by reducing an amount of time that elapses before arriving at a final packing solution that can be put into action.

As further shown in FIG. 1C, and by reference number 145, the load planning platform can select a best packing solution among the set of packing solutions based on one or more optimization criteria (e.g., a quantity of items that are placed within the three-dimensional container, heights for the set of items that have a simulated placement in the three-dimensional container, or locations for the set of items within the three-dimensional container relative to a point of ingress and egress, and/or the like). For example, in some implementations, the load planning platform can identify, among the set of packing solutions generated by applying available moves to the preliminary packing solution, a set of solutions that fit a greatest quantity of items into the three-dimensional container. In the event that multiple solutions are tied in that respect, the load planning platform can select one or more solutions that result in stacked items within the three-dimensional container having a lowest average height, which can reduce a risk of items falling over and causing damage to the items, a vehicle transporting the items, and/or the like. In the case of a further tie among multiple solutions with respect to the average height of items within the three-dimensional container, the load planning platform can select a particular solution that places more items in the back of the three-dimensional container (e.g., farther away from the point of ingress and egress), which can improve the weight balance within the container, reduce a risk of injury when a person enters the container, and/or the like.

As shown in FIG. 1D, and by reference number 150, the load planning platform can generate a three-dimensional rendering of the best packing solution and further generate a plan for loading and unloading the three-dimensional container to implement the best packing solution. In particular, as shown in FIG. 1D, the three-dimensional rendering can show a placement of each item within the three-dimensional container, with the various items marked, labeled, colored, or otherwise differentiated based on the sequence in which the items are to be loaded into and unloaded from the three-dimensional container. For example, a set of items to be unloaded first can be rendered in a first color, with a first patterned overlay, and/or the like, a second a set of items to be unloaded next can be rendered in a second color, with a second patterned overlay, and/or the like, and a set of items to be unloaded last can be rendered in a different color, with a different patterned overlay, and/or the like. Furthermore, in some implementations, the plan for loading and unloading the three-dimensional container can comprise a text-based plan that can be dispatched to personnel responsible for loading and unloading the three-dimensional container, augmented reality content for guiding personnel through loading the set of items into the three-dimensional container, and/or the like.

As further shown in FIG. 1D, and by reference number 155, the load planning platform can provide one or more client devices with access to the three-dimensional rendering of the best packing solution along with instructions for implementing the best packing solution. For example, in some implementations, the one or more client devices can display the three-dimensional rendering on a suitable display device, and the three-dimensional rendering can be rotatable, draggable, zoomable, and/or the like, thus allowing a user to easily search for a particular item or set of items and to get an overall impression of the final packing solution. Furthermore, as shown in FIG. 1D, the three-dimensional rendering can be provided with one or more user interface elements (e.g., a slider in the illustrated example) that allows the user to view the sequence in which the items are to be loaded into and unloaded from the three-dimensional container. In some implementations, the user interface elements can also allow the user to modify the sequence in which the items are to be loaded into and unloaded from the three-dimensional container, which can result in the load planning platform automatically recomputing the packing solution according to the modified sequence.

As mentioned above, the load planning platform can also provide the one or more client devices with access to instructions for implementing the best packing solution. For example, in some implementations, the instructions can be provided in the form of text-based instructions indicating where to place each item in the three-dimensional container and an order in which to place the items in the three-dimensional container. Additionally, or alternatively, the instructions can be provided together with the three-dimensional rendering. For example, the instructions can start by showing an empty truck and by showing where to place a first set of items, and then showing where to place a second set of items after confirming that the first set of items has been correctly placed (e.g., based on a user input, a sensor input, and/or the like).

Additionally, or alternatively, the instructions can be provided as augmented reality content for guiding personnel through loading the set of items into the three-dimensional container. For example, a client device having augmented reality and/or mixed reality capabilities (e.g., a smart phone, an optical see-through head mounted display, and/or the like) can be directed towards the set of items to be loaded into the three-dimensional container, and digital content can be rendered to draw attention to the first set of items to be loaded into the three-dimensional container (e.g., via a colored or patterned overlay, a billboard, and/or the like). The digital content can further indicate where to place the first set of items within the three-dimensional container, and upon confirming that the first set of items have been correctly placed, this sequence can repeat until all items have been loaded into the three-dimensional container. Furthermore, as will be apparent, the same procedures can be used as the items are subsequently unloaded from the three-dimensional container.

As indicated above, FIGS. 1A-1D are provided as one or more examples. Other examples can differ from what is described with regard to FIGS. 1A-1D. For example, although some implementations have been described herein in a context that relates to generating a plan for loading a set of items into a three-dimensional container associated with a delivery vehicle (e.g., a delivery truck), it will be appreciated that implementations described herein can be used to generate a plan for loading a set of items into any suitable three-dimensional container (e.g., an intermodal container, a shipping container, a moving truck, a railroad car, a self-storage unit, a warehouse, a pallet, and/or the like). Furthermore, while one or more implementations may be described herein as generating a plan for loading a particular set of items into a particular three-dimensional container, implementations described herein may be used to concurrently generate plans for loading many (e.g., tens, hundreds, thousands, or more) items of various sizes, shapes, durability, robustness, and/or other characteristics for tens, hundreds, thousands, or more containers (e.g., when planning how to load cargo into intermodal containers for transport via a container ship that can carry many thousands of intermodal containers).

Figure 2:
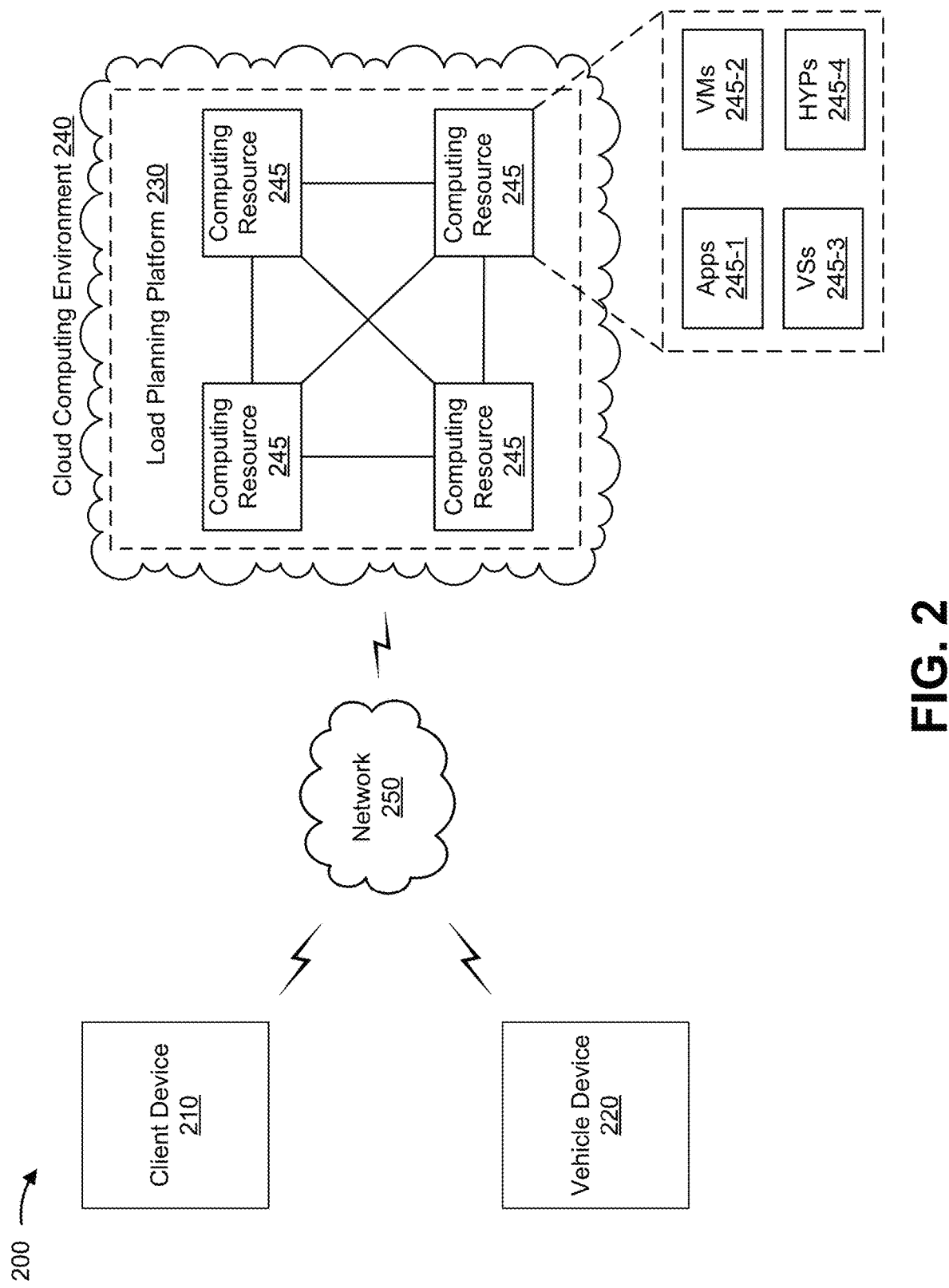
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a client device 210, a vehicle device 220, a load planning platform 230 in a cloud computing environment 240 that includes one or more computing resources 245, a network 250, and/or the like. Devices of environment 200 can interconnect via wired connections, wireless connections, or a combination of wired and wireless connections.

Client device 210 includes one or more devices capable of receiving, generating, storing, processing, and/or providing information that relates to load planning for a three-dimensional container. For example, client device 210 can include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, an RFID reader, an augmented reality or mixed reality device, a hand-held laser scanner, a structured light scanner, or a similar device. In some implementations, client device 210 can transmit information to load planning platform 230 (e.g., information relating to dimensions, a weight limit, and/or other suitable constraints associated with a three-dimensional container, a quantity, size, weight, robustness, and/or other suitable parameters associated with a set of items to be loaded into the three-dimensional container, and/or the like). In some implementations, client device 210 can receive information from load planning platform 230 (e.g., information relating to a three-dimensional rendering of a loading and unloading plan, instructions for implementing the load and unloading plan, and/or the like).

Vehicle device 220 includes one or more devices capable of receiving, generating, storing, processing, and/or providing information that relates to load planning for a three-dimensional container. In some implementations, vehicle device 220 can include a device integrated within a vehicle (e.g., a truck, a train, a boat, a van, a bus, a car, and/or the like). For example, vehicle device 220 can include a telematics device, a Global Positioning System (GPS) device, an electronic control module (ECM), an on-board diagnostics (OBD) device, an in-vehicle infotainment (IVI) system, an in-car entertainment (ICE) system, and/or a similar type of device. In some implementations, vehicle device 220 can include a device that is separate from but associated with a vehicle, such as a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, vehicle device 220 can receive information from and/or transmit information to client device 210 and/or load planning platform 230, as described herein.

Load planning platform 230 includes one or more devices capable of receiving, generating, storing, processing, and/or providing information associated with load planning for a three-dimensional container. For example, load planning platform 230 can receive information related to loading constraints for the three-dimensional container and parameters for a set of items to be loaded into the three-dimensional container and generate a preliminary packing solution based on the received information in combination with information related to a sequence in which the set of items are to be unloaded from the three-dimensional container. Load planning platform 230 can further generate a set of packing solutions by applying, to the preliminary packing solution, one or more available moves that change a simulated placement in the three-dimensional container for one or more items in the set of items. Accordingly, load planning platform 230 can select a final packing solution from the set of packing solutions based on one or more optimization criteria and provide client device 210, vehicle device 220, and/or another suitable device with access to a three-dimensional rendering of the final packing solution and instructions for implementing the final packing solution based on the sequence in which the set of items are to be unloaded from the three-dimensional container.

In some implementations, as shown, load planning platform 230 can be hosted in a cloud computing environment 240. Notably, while implementations described herein describe load planning platform 230 as being hosted in cloud computing environment 240, in some implementations, load planning platform 230 can be non-cloud-based (i.e., can be implemented outside of a cloud computing environment) or partially cloud-based.

Cloud computing environment 240 includes an environment that hosts load planning platform 230. Cloud computing environment 240 can provide computation, software, data access, storage, etc. services that do not require end-user knowledge of a physical location and configuration of system(s) and/or device(s) that hosts load planning platform 230. As shown, cloud computing environment 240 can include a group of computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 can host load planning platform 230. The cloud resources can include compute instances executing in computing resource 245, storage devices provided in computing resource 245, data transfer devices provided by computing resource 245, and/or the like. In some implementations, computing resource 245 can communicate with other computing resources 245 via wired connections, wireless connections, or a combination of wired and wireless connections.

As further shown in FIG. 2, computing resource 245 includes a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that can be provided to or accessed by client device 210, vehicle device 220, and/or the like. Application 245-1 can eliminate a need to install and execute the software applications on client device 210, vehicle device 220, and/or the like. For example, application 245-1 can include software associated with load planning platform 230 and/or any other software capable of being provided via cloud computing environment 240. In some implementations, one application 245-1 can send/receive information to/from one or more other applications 245-1, via virtual machine 245-2.

Virtual machine 245-2 includes a software implementation of a machine (e.g., a computer) that executes programs like a physical machine. Virtual machine 245-2 can be either a system virtual machine or a process virtual machine, depending upon use and degree of correspondence to any real machine by virtual machine 245-2. A system virtual machine can provide a complete system platform that supports execution of a complete operating system ("OS"). A process virtual machine can execute a single program, and can support a single process. In some implementations, virtual machine 245-2 can execute on behalf of a user (e.g., a user of client device 210, vehicle device 220, and/or the like), and can manage infrastructure of cloud computing environment 240, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 245-4 can provide hardware virtualization techniques that allow multiple operating systems (e.g., "guest operating systems") to execute concurrently on a host computer, such as computing resource 245. Hypervisor 245-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 2 are provided as one or more examples. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
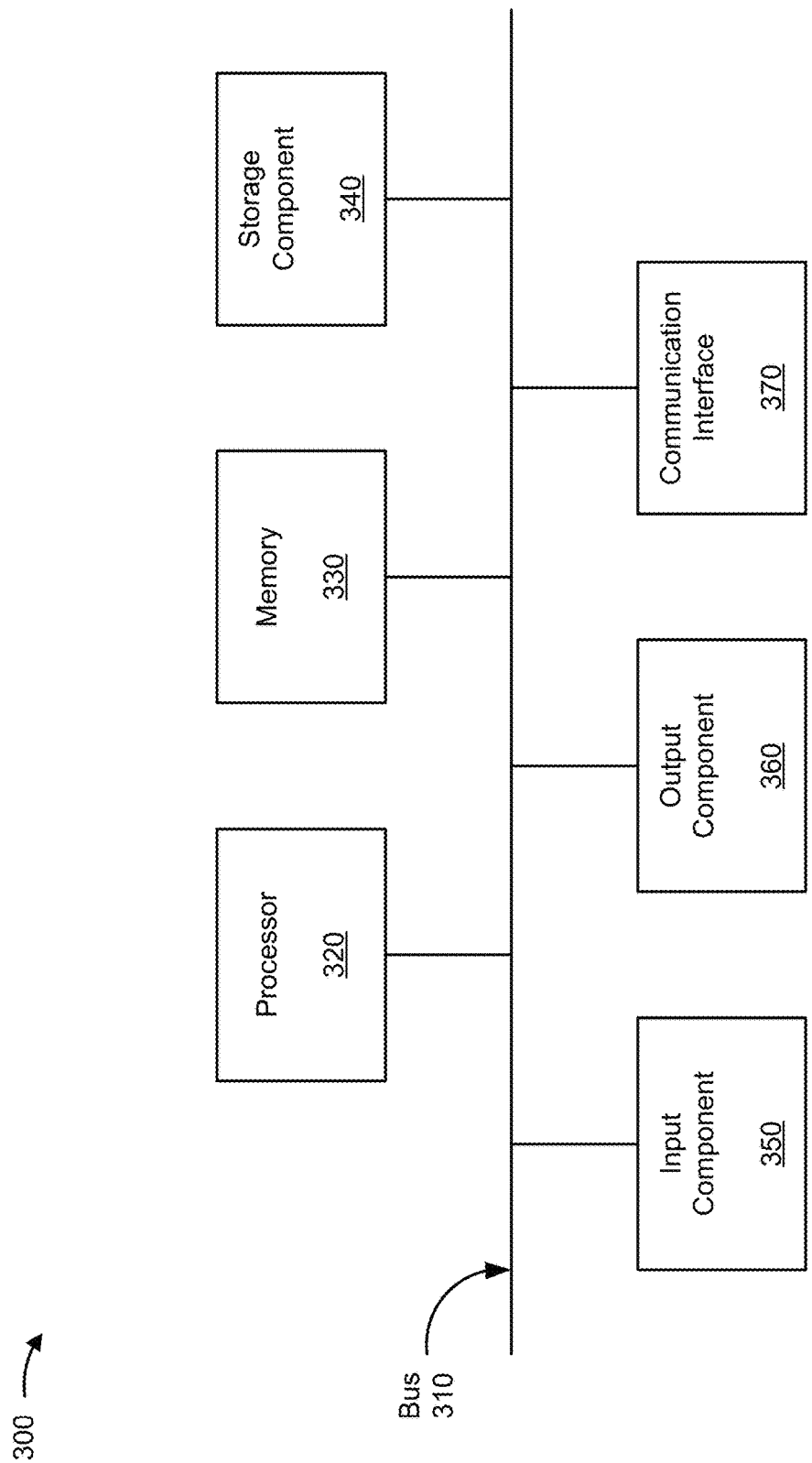
FIG. 3 is a diagram of example components of one or more devices of FIG. 2.

FIG. 3 is a diagram of example components of a device 300. Device 300 can correspond to client device 210, vehicle device 220, and/or load planning platform 230. In some implementations, client device 210, vehicle device 220, and/or load planning platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
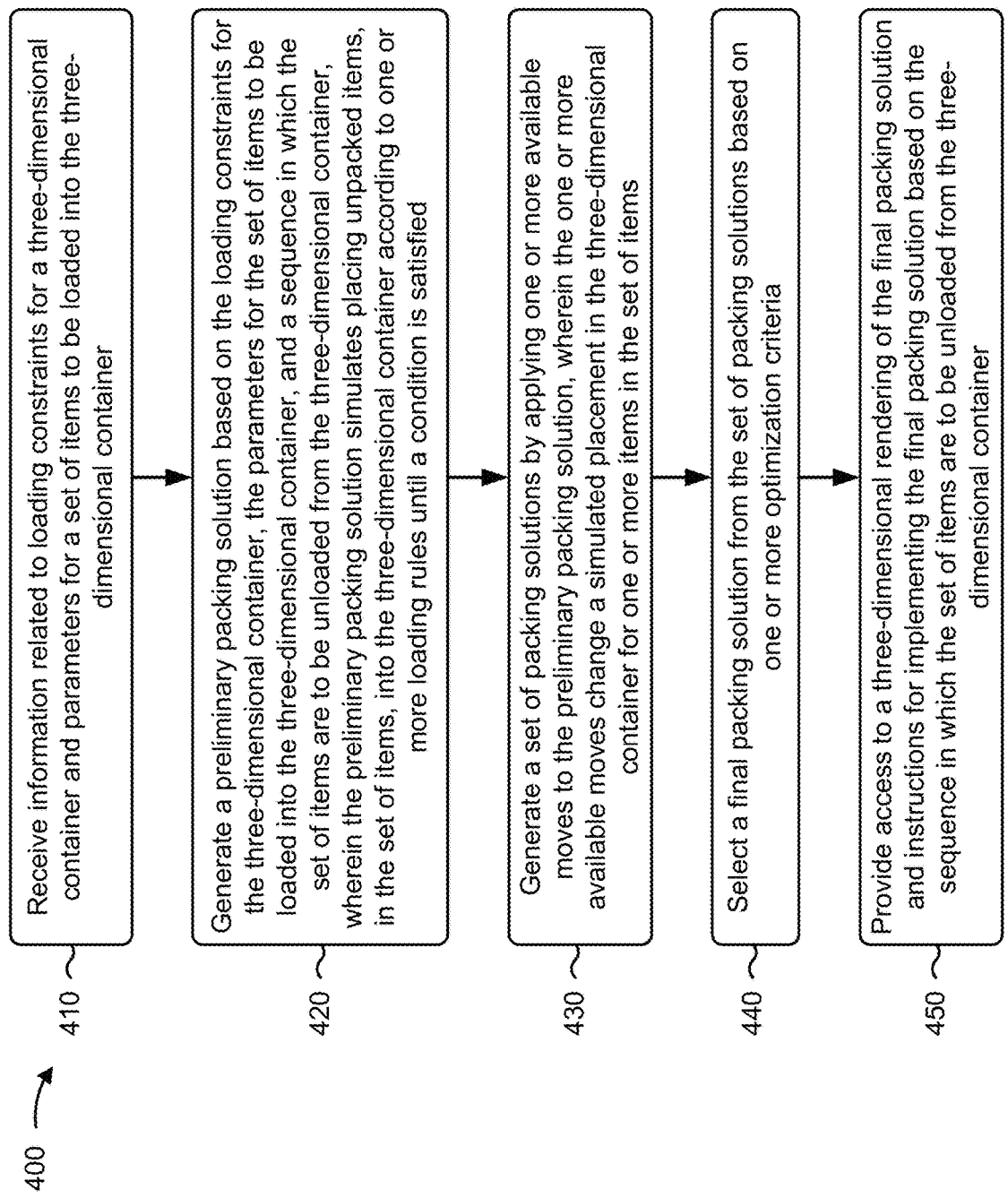
FIG. 4 is a flow chart of an example process for load planning optimization using automated three-dimensional packing.

FIG. 4 is a flow chart of an example process 400 for load planning optimization using automated three-dimensional packing. In some implementations, one or more process blocks of FIG. 4 can be performed by load planning platform (e.g., load planning platform 230). In some implementations, one or more process blocks of FIG. 4 can be performed by another device or a group of devices separate from or including the load planning platform, such as a client device (e.g., client device 210), a vehicle device (e.g., vehicle device 220), and/or the like.

As shown in FIG. 4, process 400 can include receiving information related to loading constraints for a three-dimensional container and parameters for a set of items to be loaded into the three-dimensional container (block 410). For example, the load planning platform (e.g., using computing resource 245, processor 320, memory 330, storage component 340, input component 350, output component 360, communication interface 370, and/or the like) can receive information related to loading constraints for a three-dimensional container and parameters for a set of items to be loaded into the three-dimensional container, as described above.

As further shown in FIG. 4, process 400 can include generating a preliminary packing solution based on the loading constraints for the three-dimensional container, the parameters for the set of items to be loaded into the three-dimensional container, and a sequence in which the set of items are to be unloaded from the three-dimensional container, wherein the preliminary packing solution simulates placing unpacked items, in the set of items, into the three-dimensional container according to one or more loading rules until a condition is satisfied (block 420). For example, the load planning platform (e.g., using computing resource 245, processor 320, memory 330, storage component 340, input component 350, output component 360, communication interface 370, and/or the like) can generate a preliminary packing solution based on the loading constraints for the three-dimensional container, the parameters for the set of items to be loaded into the three-dimensional container, and a sequence in which the set of items are to be unloaded from the three-dimensional container, as described above. In some implementations, the preliminary packing solution simulates placing unpacked items, in the set of items, into the three-dimensional container according to one or more loading rules until a condition is satisfied.

As further shown in FIG. 4, process 400 can include generating a set of packing solutions by applying one or more available moves to the preliminary packing solution, wherein the one or more available moves change a simulated placement in the three-dimensional container for one or more items in the set of items (block 430). For example, the load planning platform (e.g., using computing resource 245, processor 320, memory 330, storage component 340, input component 350, output component 360, communication interface 370, and/or the like) can generate a set of packing solutions by applying one or more available moves to the preliminary packing solution, as described above. In some implementations, the one or more available moves change a simulated placement in the three-dimensional container for one or more items in the set of items.

As further shown in FIG. 4, process 400 can include selecting a final packing solution from the set of packing solutions based on one or more optimization criteria (block 440). For example, the load planning platform (e.g., using computing resource 245, processor 320, memory 330, storage component 340, input component 350, output component 360, communication interface 370, and/or the like) can select a final packing solution from the set of packing solutions based on one or more optimization criteria, as described above.

As further shown in FIG. 4, process 400 can include providing access to a three-dimensional rendering of the final packing solution and instructions for implementing the final packing solution based on the sequence in which the set of items are to be unloaded from the three-dimensional container (block 450). For example, the load planning platform (e.g., using computing resource 245, processor 320, memory 330, storage component 340, input component 350, output component 360, communication interface 370, and/or the like) can provide access to a three-dimensional rendering of the final packing solution and instructions for implementing the final packing solution based on the sequence in which the set of items are to be unloaded from the three-dimensional container, as described above.

Process 400 can include additional implementations, such as any single implementation or any combination of implementations described below and/or in connection with one or more other processes described elsewhere herein.

In some implementations, generating the preliminary packing solution includes selecting, among the set of items to be loaded into the three-dimensional container, one or more unpacked items to be unloaded last, and determining, for the one or more unpacked items, a simulated placement in the three-dimensional container that satisfies the one or more loading rules.

In some implementations, the condition is satisfied when each item in the set of items has a simulated placement in the three-dimensional container or when the set of items does not include any unpacked items that can be placed in the three-dimensional container while satisfying the one or more loading rules.

In some implementations, the one or more optimization criteria are based on one or more of a quantity of the set of items that have a simulated placement in the three-dimensional container, heights for the set of items that have a simulated placement in the three-dimensional container, or locations for the set of items within the three-dimensional container relative to a point of ingress and egress.

In some implementations, the one or more loading rules include a restriction on vertically rotating one or more particular items in the set of items, a set of criteria for stacking multiple items, and a requirement to preserve a path to each item having a simulated placement in the three-dimensional container relative to a point of ingress and egress.

In some implementations, the one or more available moves change the simulated placement by one or more of rotating one or more items in the set of items, swapping the simulated placement for one or more items in the set of items, moving one or more items in the set of items to an unoccupied space, or inserting an unpacked item, in the set of items, into the three-dimensional container.

In some implementations, the instructions for implementing the final packing solution comprise augmented reality content for guiding a user through loading the set of items into the three-dimensional container based on the sequence in which the set of items are to be unloaded from the three-dimensional container.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, at a device, information related to loading constraints for a container and parameters for a set of items to be loaded into the container;
   generating, by the device and according to one or more loading rules, a preliminary packing solution that simulates placing unpacked items, in the set of items, into the container, wherein the one or more loading rules are based on the loading constraints for the container and the parameters for the set of items;
   generating, by the device, a set of packing solutions by applying one or more available moves to the preliminary packing solution until a condition is satisfied relating to at least one of:
      a quantity of the one or more available moves applied, or
      an amount of time spent applying the one or more available moves;
   selecting, by the device, a final packing solution from the set of packing solutions based on one or more optimization criteria associated with the container and the set of items; and
   providing, by the device, access to a three-dimensional rendering of the final packing solution, wherein the three-dimensional rendering differentiates each item in the set of items based on a sequence in which the set of items are to be unloaded from the container.

2. The method of claim 1, wherein generating the preliminary packing solution includes:
   selecting, among the set of items to be loaded into the container, one or more of the unpacked items to be unloaded last; and
   determining, for the one or more of the unpacked items, a simulated placement in the container that satisfies the one or more loading rules.

3. The method of claim 1, wherein the preliminary packing solution simulates placing the unpacked items until each item in the set of items has a simulated placement in the container or until the set of items does not include any unpacked items that can be placed in the container while satisfying the one or more loading rules.

4. The method of claim 1, further comprising:
   providing instructions for implementing the final packing solution, wherein the instructions include one or more of textual content, augmented reality content, or mixed reality content.

5. The method of claim 1, wherein the one or more loading rules include at least one of:
   a restriction on rotating one or more particular items in the set of items, a set of criteria for stacking multiple items in the set of items, or
   a requirement to preserve a path for unloading each item in the set of items.

6. The method of claim 1, wherein the one or more available moves change the preliminary packing solution by one or more of:
   rotating one or more items in the set of items, swapping a simulated placement for one or more items in the set of items, moving one or more items in the set of items to an unoccupied space, or
   inserting an unpacked item in the set of items into the container.

7. The method of claim 1, wherein providing access to the three-dimensional rendering of the final packing solution comprises:

causing the three-dimensional rendering of the final packing solution to be displayed on a display device, wherein the three-dimensional rendering of the final packing solution enables virtual interaction with the set of items.

8. A device, comprising:
one or more memories; and
one or more processors, coupled to the one or more memories, configured to:
receive information related to loading constraints for a container and parameters for a set of items to be loaded into the container;
generate, according to one or more loading rules, a preliminary packing solution that simulates placing unpacked items, in the set of items, into the container, wherein the one or more loading rules are based on the loading constraints for the container and the parameters for the set of items;
generate a set of packing solutions by applying one or more available moves to the preliminary packing solution until a condition is satisfied relating to at least one of:
a quantity of the one or more available moves applied, or
an amount of time spent applying the one or more available moves;
select a final packing solution from the set of packing solutions based on one or more optimization criteria associated with the container and the set of items; and
provide access to a three-dimensional rendering of the final packing solution, wherein the three-dimensional rendering differentiates each item in the set of items based on a sequence in which the set of items are to be unloaded from the container.

9. The device of claim 8, wherein the one or more processors, when generating the preliminary packing solution, are further configured to:
select, among the set of items to be loaded into the container, one or more of the unpacked items to be unloaded last; and
determine, for the one or more of the unpacked items, a simulated placement in the container that satisfies the one or more loading rules.

10. The device of claim 8, wherein the preliminary packing solution simulates placing the unpacked items until each item in the set of items has a simulated placement in the container or until the set of items does not include any unpacked items that can be placed in the container while satisfying the one or more loading rules.

11. The device of claim 8, wherein the one or more processors are further configured to:
provide instructions for implementing the final packing solution, wherein the instructions include one or more of textual content, augmented reality content, or mixed reality content.

12. The device of claim 8, wherein the one or more loading rules include at least one of:
a restriction on rotating one or more particular items in the set of items, a set of criteria for stacking multiple items in the set of items, or
a requirement to preserve a path for unloading each item in the set of items.

13. The device of claim 8, wherein the one or more available moves change the preliminary packing solution by one or more of:
rotating one or more items in the set of items, swapping a simulated placement for one or more items in the set of items, moving one or more items in the set of items to an unoccupied space, or
inserting an unpacked item in the set of items into the container.

14. The device of claim 8, wherein the one or more processors, when providing access to the three-dimensional rendering of the final packing solution, are further configured to:
cause the three-dimensional rendering of the final packing solution to be displayed on a display device, wherein the three-dimensional rendering of the final packing solution enables virtual interaction with the set of items.

15. A non-transitory computer-readable medium storing a set of instructions, the set of instructions comprising:
one or more instructions that, when executed by one or more processors of a device, cause the device to:
receive information related to loading constraints for a container and parameters for a set of items to be loaded into the container;
generate, according to one or more loading rules, a preliminary packing solution that simulates placing unpacked items, in the set of items, into the container,
wherein the one or more loading rules are based on the loading constraints for the container and the parameters for the set of items;
generate a set of packing solutions by applying one or more available moves to the preliminary packing solution until a condition is satisfied relating to at least one of:
a quantity of the one or more available moves applied, or
an amount of time spent applying the one or more available moves;
select a final packing solution from the set of packing solutions based on one or more optimization criteria associated with the container and the set of items-; and
provide access to a three-dimensional rendering of the final packing solution, wherein the three-dimensional rendering differentiates each item in the set of items based on a sequence in which the set of items are to be unloaded from the container.

16. The non-transitory computer-readable medium of claim 15, wherein the one or more instructions, that cause the one or more processors to generate the preliminary packing solution, cause the one or more processors to:
select, among the set of items to be loaded into the container, one or more of the unpacked items to be unloaded last; and
determine, for the one or more of the unpacked items, a simulated placement in the container that satisfies the one or more loading rules.

17. The non-transitory computer-readable medium of claim 15, wherein the preliminary packing solution simulates placing the unpacked items until each item in the set of items has a simulated placement in the container or until the set of items does not include any unpacked items that can be placed in the container while satisfying the one or more loading rules.

18. The non-transitory computer-readable medium of claim 15, wherein the one or more loading rules include at least one of:

a restriction on rotating one or more particular items in the set of items, a set of criteria for stacking multiple items in the set of items, or a requirement to preserve a path for unloading each item in the set of items.

19. The non-transitory computer-readable medium of claim 15, wherein the one or more available moves change the preliminary packing solution by one or more of:

rotating one or more items in the set of items, swapping a simulated placement for one or more items in the set of items, moving one or more items in the set of items to an unoccupied space, or inserting an unpacked item in the set of items into the container.

20. The non-transitory computer-readable medium of claim 15, wherein the one or more instructions, that cause the one or more processors to provide access to the three-dimensional rendering of the final packing solution, cause the one or more processors to:

cause the three-dimensional rendering of the final packing solution to be displayed on a display device, wherein the three-dimensional rendering of the final packing solution enables virtual interaction with the set of items.

* * * * *